(12) United States Patent
Funakoshi

(10) Patent No.: US 10,734,029 B2
(45) Date of Patent: Aug. 4, 2020

(54) SIGNAL PROCESSING APPARATUS, SIGNAL PROCESSING METHOD, AND NON-TRANSITORY COMPUTER-READABLE STORAGE MEDIUM

(71) Applicant: CANON KABUSHIKI KAISHA, Tokyo (JP)

(72) Inventor: Masanobu Funakoshi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 31 days.

(21) Appl. No.: 15/971,526

(22) Filed: May 4, 2018

(65) Prior Publication Data

US 2018/0330759 A1 Nov. 15, 2018

(30) Foreign Application Priority Data

May 11, 2017 (JP) ................. 2017-094879

(51) Int. Cl.
*G11B 27/28* (2006.01)
*H04N 5/91* (2006.01)
*G11B 27/00* (2006.01)
*H04N 5/783* (2006.01)

(52) U.S. Cl.
CPC ............ *G11B 27/28* (2013.01); *G11B 27/005* (2013.01); *H04N 5/783* (2013.01); *H04N 5/91* (2013.01)

(58) Field of Classification Search
CPC ..... G11B 27/28; G11B 27/005; G11B 27/031; H04N 21/2743; H04N 21/431; H04N 21/84; H04N 21/8456

USPC ......................................................... 386/343
See application file for complete search history.

(56) References Cited

U.S. PATENT DOCUMENTS

| 9,106,804 | B2 * | 8/2015 | Roberts | G11B 27/031 |
| 2010/0226624 | A1 | 9/2010 | Yamori et al. | |
| 2013/0058619 | A1 * | 3/2013 | Miyakawa | H04N 5/77 386/225 |
| 2017/0006328 | A1 * | 1/2017 | Verticchio | H04N 21/4147 |

FOREIGN PATENT DOCUMENTS

| JP | 2010206641 A | 9/2010 |
| JP | 2011055386 A | 3/2011 |

* cited by examiner

*Primary Examiner* — Thai Q Tran
*Assistant Examiner* — Syed Y Hasan
(74) *Attorney, Agent, or Firm* — Rossi, Kimms & McDowell LLP

(57) ABSTRACT

A signal processing apparatus for generating a playback audio signal to be played back together with a slow-motion image based on image capturing in a capturing target region, obtains a first audio signal containing a sound in the capturing target region, and based on sound acquisition in a first period shorter than a capturing period corresponding to the slow-motion image, obtains a second audio signal containing a sound in a peripheral region of the capturing target region, and based on sound acquisition in a second period longer than the capturing period, and synthesizes the first audio signal and the second audio signal, thereby generating the playback audio signal to be played back together with the slow-motion image.

19 Claims, 11 Drawing Sheets

FIG. 10A

IMAGE EVENT INFORMATION

| IMAGE EVENT ID | ~111 |
| --- | --- |
| IMAGE EVENT OCCURRENCE TIME | ~112 |
| IMAGE EVENT TYPE | ~113 |

FIG. 10B

SPORTS SOUND EVENT INFORMATION

| SPORTS SOUND EVENT ID | ~114 |
| --- | --- |
| INPUT CHANNEL NUMBER | ~115 |
| SPORTS SOUND EVENT START TIME | ~116 |
| SPORTS SOUND EVENT END TIME | ~117 |

FIG. 10C

CHEER SOUND EVENT INFORMATION

| CHEER SOUND EVENT ID | ~118 |
| --- | --- |
| INPUT CHANNEL NUMBER | ~119 |
| CHEER SOUND EVENT OCCURRENCE TIME | ~120 |
| MAXIMUM SOUND PRESSURE | ~121 |

SIGNAL PROCESSING APPARATUS, SIGNAL PROCESSING METHOD, AND NON-TRANSITORY COMPUTER-READABLE STORAGE MEDIUM

BACKGROUND OF THE INVENTION

Field of the Invention

The present invention relates to a technique of playing back a sound suitable for a playback image.

Description of the Related Art

There is a conventional technique by which a sound including an environment surrounding a capturing target is recorded in addition to an image and sound of the target, and, when playing back the image in slow motion, a sound suitable for the image is generated and played back based on the recorded audio signal.

In Japanese Patent Laid-Open No. 2010-206641, the sound of an event (an event sound) such as a hitting sound is detected from a sound recorded during imaging. Then, the playback start times of the image and sound are calculated and the image and sound are played back, so that the event sound is played back in synchronism with the time at which an image of a portion where the event sound is detected is played back during slow-motion image playback.

Also, in Japanese Patent Laid-Open No. 2011-55386, a sound having the same length as that of a moving image is recorded during slow-motion imaging. The recorded sound source is separated into a human voice, an impulsion related sound (for example, a hitting sound or kicking sound), and other sounds. During slow-motion playback, the other sounds are directly played back in slow motion, and a process of prolonging the time of the human voice while holding the pitch of the voice is performed. Also, an echoing process is performed on the impulsion related sound so that the echo is repetitively played back a number of times.

In the technique of Japanese Patent Laid-Open No. 2010-206641, when playing back an image in slow motion, an event sound is played back in synchronism with the time during which the image of a portion where the event sound is detected is played back. Since, however, the sound having the same period as that of the image is played back at a normal speed, portions of the slow-motion image playback before and after the event become soundless, so the way the sound is heard becomes unnatural.

Also, in the technique of Japanese Patent Laid-Open No. 2011-55386, a sound is played back by applying echo to the sound, the process of prolonging the playback time while holding the pitch is performed, and slow-motion playback is performed. Consequently, a processed sound different from the actual sound is played back, so the way the sound is heard becomes unnatural.

SUMMARY OF THE INVENTION

This disclosure has been made in consideration of the above problems, and provides a technique for playing back a sound suitable for a playback image.

According to one aspect of the present invention, there is provided a signal processing apparatus for generating a playback audio signal to be played back together with a slow-motion image based on image capturing in a capturing target region which comprises: a first obtaining unit configured to obtain a first audio signal containing a sound in the capturing target region, the first audio signal being based on sound acquisition in a first period shorter than a capturing period corresponding to the slow-motion image; a second obtaining unit configured to obtain a second audio signal containing a sound in a peripheral region of the capturing target region, the second audio signal being based on sound acquisition in a second period longer than the capturing period; and a generation unit configured to synthesize the first audio signal obtained by the first obtaining unit and the second audio signal obtained by the second obtaining unit, thereby generating the playback audio signal to be played back together with the slow-motion image.

Further features of the present invention will become apparent from the following description of exemplary embodiments (with reference to the attached drawings).

BRIEF DESCRIPTION OF THE DRAWINGS

FIGS. 10A, 10B, and 10C are respectively views showing the data structures of image event information, sports sound event information, and cheer sound event information.

DESCRIPTION OF THE EMBODIMENTS

Figure 1A:
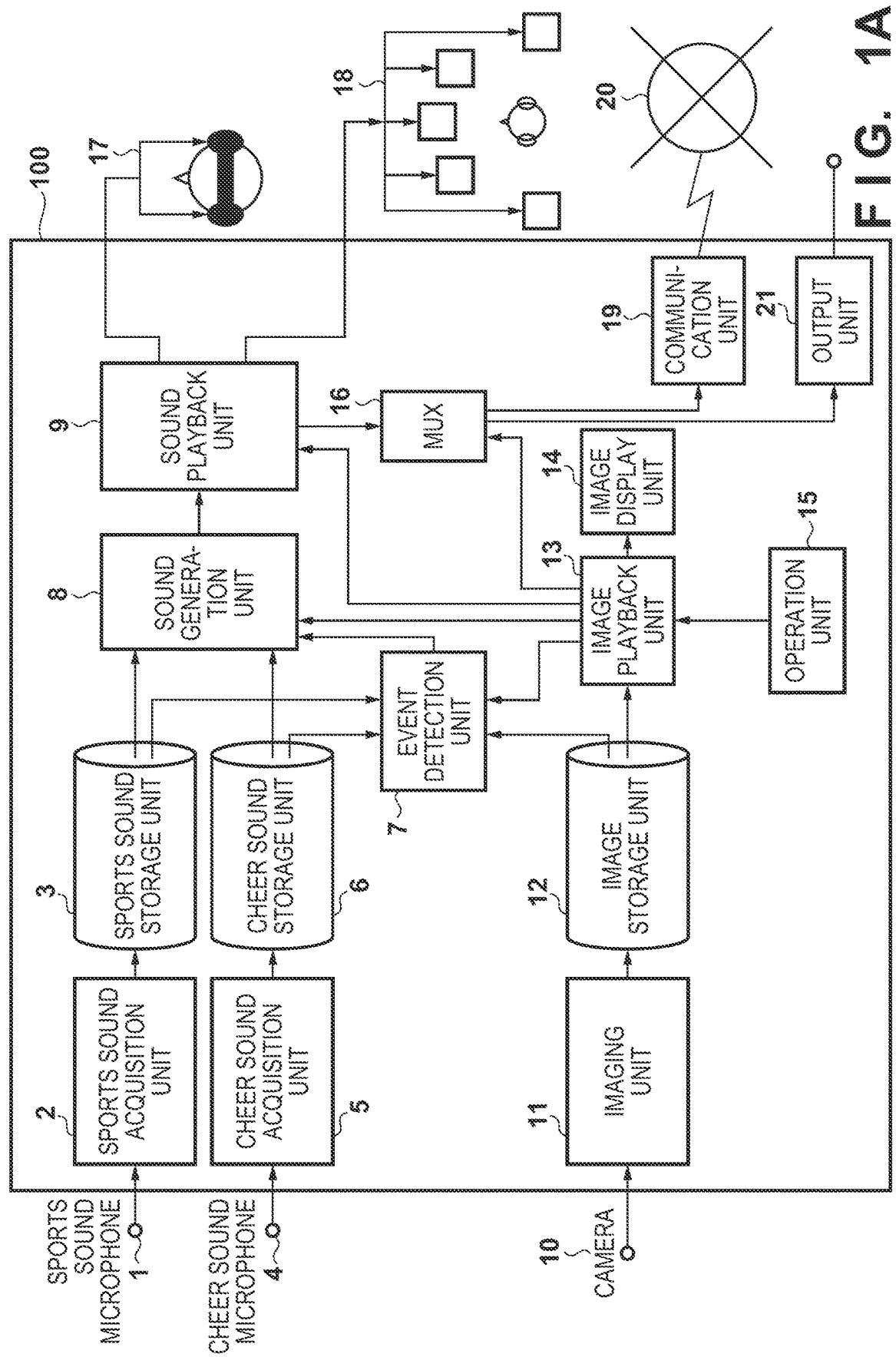
FIG. 1A is a block diagram showing a configuration example of an image/sound playback system.

Embodiments of the present invention will be explained below with reference to the accompanying drawings. Note that the following embodiments do not limit the present invention, and not all combinations of features explained in the embodiments are necessarily essential to the solution of the present invention. Note also that the same components will be explained by attaching the same reference numerals.

FIG. 1A is a block diagram showing a configuration example of an image/sound playback system according to an embodiment. Note that in this embodiment, a capturing target is a predetermined sport. Note also that sounds to be acquired are a sound generated in a sports region (capturing target region) where a sport as a capturing target is performed (for example, a sound generated by a player in a sports field (game field)), and an environmental sound generated from a peripheral space surrounding the sports region of the capturing target (for example, a cheer of spectators in the stand). However, the capturing target region where sounds are collected may also be a stage of an event, and the peripheral space may also be spectator seats. The image/sound playback system of this embodiment includes an information processing apparatus 100, a sports sound microphone 1, a cheer sound microphone 4, a camera 10, a headphone 17, and surround speakers 18.

Figure 1B:
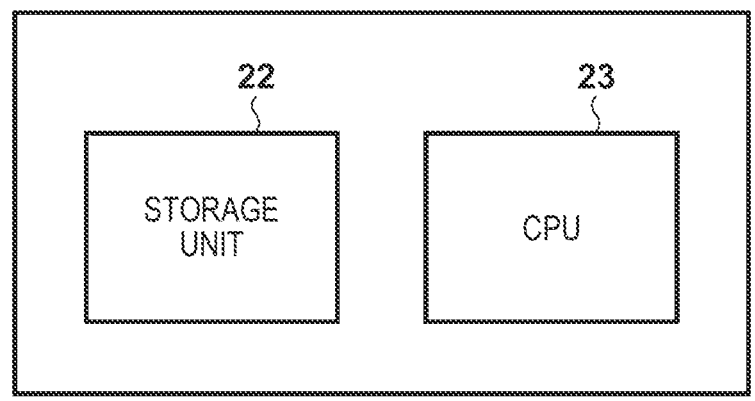
FIG. 1B is a block diagram showing a hardware configuration example of an information processing apparatus.

Each sports sound microphone 1 included in a sports sound microphone group of a plurality of microphones acquires a sound of a target sport (a sound generated from a predetermined region of a capturing target), converts the sound into an electric signal (analog signal), and transmits the signal. The sports sound microphone 1 is installed in the direction of a target sport. A sports sound acquisition unit 2 functions as a sports sound acquiring means. The sports sound acquisition unit 2 properly amplifies the electric signal of a sound transmitted from the sports sound microphone 1, converts the analog signal into a digital signal, and transmits the digital signal as a sports sound signal (first sound) to a sports sound storage unit 3. The sports sound storage unit 3 stores the sports sound signal (to be also simply referred to as a sports sound hereinafter) transmitted by the sports sound acquisition unit 2, together with time information. This time information is, for example, information of the time at which the sports sound signal is input to the sports sound storage unit 3. The sports sound storage unit 3 appropriately outputs a sports sound at a designated time to an event detection unit 7, in accordance with an instruction by a CPU 23 (FIG. 1B). Each cheer sound microphone 4 included in a cheer sound microphone group of a plurality of microphones acquires a cheer sound in an environment where the target sport is performed (a sound in a peripheral region of a predetermined region of the capturing target), converts the acquired sound into an electric signal (analog signal), and transmits the signal. The cheer sound microphone 4 is installed in the direction of spectators.

Figure 2:
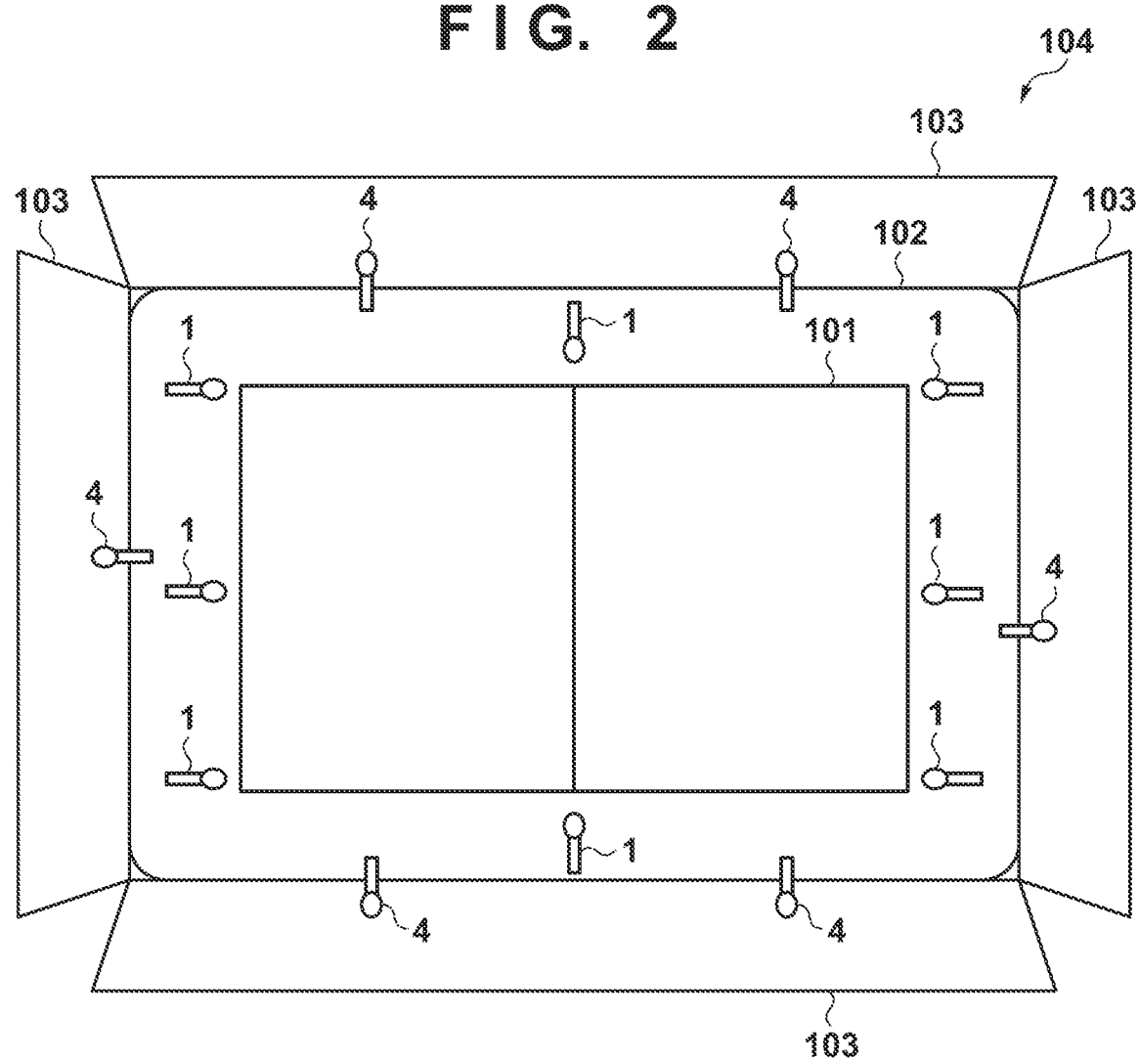
FIG. 2 is a schematic view showing an installation image of sports sound microphones and cheer sound microphones.

An installation example of the sports sound microphones 1 and cheer sound microphones 4 will be explained below with reference to FIG. 2. FIG. 2 is a schematic view showing an installation image of the sports sound microphones 1 and cheer sound microphones 4. In this example shown in FIG. 2, a plurality of sports sound microphones 1 and a plurality of cheer sound microphones 4 are arranged in a stadium 104 where a target sport is performed. The stadium 104 includes a sports field 101, a ground 102, and stands 103. The target sport is performed in the sports field 101. The ground 102 is a horizontal plane including the sports field 101. In the example shown in FIG. 2, the sports sound microphones 1 are installed on the ground 102. In the stands 103, spectators watch the target sport and cheer in accordance with the progress of the sport.

As shown in FIG. 2, the plurality of sports sound microphones 1 are so arranged as to surround the sports field 101 in order to acquire sports sounds. Also, the plurality of cheer sound microphones 4 are arranged in order to acquire sounds generated in the stands. Note that in FIG. 2, the plurality of sports sound microphones 1 and the plurality of cheer sound microphones 4 are arranged. However, it is also possible to arrange one sports sound microphone and one cheer sound microphone. Alternatively, a sound for playback may also be generated by using only an acquired sound signal of a selected microphone of the plurality of microphones. Furthermore, a signal obtained by separating only the sports sound may also be used as a sports sound signal, by suppressing, with respect to an audio signal acquired by the sports sound microphone 1, a signal acquired by a nearby cheer sound microphone 4.

Note that a case using one sports sound microphone 1 and one cheer sound microphone 4 will mainly be explained below for convenience of explanation. However, the following processing can also be performed when generating a sports sound by using the plurality of sports sound microphones 1, or when generating a cheer sound by using the plurality of cheer sound microphones 4.

Referring back to FIG. 1A, a cheer sound acquisition unit 5 functions as a cheer sound acquiring means. The cheer sound acquisition unit 5 appropriately amplifies a sound electric signal transmitted from the cheer sound microphone 4, converts the analog signal into a digital signal, and transmits this digital signal as a cheer sound signal (second sound) to a cheer sound storage unit 6. The cheer sound storage unit 6 stores the cheer sound signal (to be also simply referred to as a cheer sound hereinafter) transmitted by the cheer sound acquisition unit 5, together with time information. This time information is, for example, information of the time at which the cheer sound signal is input to the cheer sound storage unit 6. The cheer sound storage unit 6 appropriately outputs a sports sound at a designated time to the event detection unit 7 in accordance with an instruction from the CPU 23 (FIG. 1B).

In a playback image time interval set via an operation unit 15 and an image playback unit 13, the event detection unit 7 analyzes the sports sound stored in the sports sound storage unit 3, the cheer sound stored in the cheer sound storage unit 6, and an image stored in an image storage unit 12. Then, the event detection unit 7 detects an event in the set time interval and the occurrence time of the event, and transmits the detection results to a sound generation unit 8.

Based on the time interval and playback speed of the playback image set via the operation unit 15 and image playback unit 13 and the event occurrence time received from the event detection unit 7, the sound generation unit 8 extracts necessary sound data (sports sound/cheer sound) from the sports sound storage unit 3 and cheer sound storage unit 6, and generates an audio signal suitable for the image. The sound generation unit 8 outputs the generated audio signal to the sound playback unit 9.

In synchronism with a playback start trigger signal received from the image playback unit 13, a sound playback unit 9 renders the audio signal received from the sound generation unit into various sound playback formats such as "stereo" and "surround". The sound playback unit 9 transmits the rendered audio signal (including a stereo signal and binaural signal) to various sound playback apparatuses (the headphone 17 and surround speakers 18), or to an MUX 16.

The camera 10 captures an image of the target sport and transmits a video signal to an imaging unit. An imaging unit 11 forms image data by performing an image correction process on the video signal received from the camera 10 (an image obtaining process), and transmits the image data to the image storage unit. The image storage unit 12 stores the image data (to be also simply referred to as an image hereinafter) received from the imaging unit 11, together with time information. This time information is, for example, information of the time at which the image data is input to the image storage unit 12.

The image playback unit 13 extracts, from the image storage unit 12, the image of a playback image time interval designated via the operation unit 15. Also, the image playback unit 13 transmits information of the playback image time interval designated via the operation unit 15 and information of the playback speed to the event detection unit 7 and sound generation unit 8. In addition, when starting image playback, the image playback unit 13 transmits a playback start trigger signal to the sound playback unit 9, and performs image playback at the playback speed designated by the user. This playback start trigger signal is generated in accordance with, for example, a user's instruction transmitted via the operation unit 15. The image playback unit 13 outputs the played back video signal to an image display unit 14 or the MUX 16.

The operation unit 15 accepts various instructions from the user, converts the accepted instructions into control commands, and transmits the commands to the image playback unit 13. These instructions include a playback instruction for normal playback at an actual speed (an equal speed, a onefold speed) or slow-motion playback at a speed lower than that of normal playback. The normal playback instruction contains information for specifying the time interval (playback period) and playback speed of a playback image, and the slow-motion playback instruction contains information for specifying the playback time interval and the slow-motion playback speed of a playback image.

The image display unit 14 displays the video signal received from the image playback unit 13 as an image. The MUX 16 forms video/audio stream data by superposing the audio signal received from the sound playback unit 9 and the video signal received from the image playback unit, and outputs the data to a communication unit 19 and an output unit 21.

The headphone 17 converts the stereo signal or binaural signal output from the sound playback unit 9 into a sound, and outputs the sound. The surround speakers 18 convert the stereo signal or surround signal output from the sound playback unit 9 into a sound, and output the sound. The communication unit 19 outputs the video/audio stream signal received from the MUX 16 to the outside via a communication network 20.

The communication network 20 indicates the Internet or a general telephone line. In this embodiment, the video/audio stream formed by the MUX 16 can be output to an apparatus outside the system across the communication network 20. The output unit 21 outputs the video/audio stream formed by the MUX 16 to an external apparatus connected to the output terminal.

FIG. 1B is a block diagram showing a hardware configuration example of the information processing apparatus 100. A storage unit 22 is a RAM (Random Access Memory) or ROM (Read Only Memory). The CPU 23 controls the operation of each constituent element in the information processing apparatus 100 shown in FIG. 1A. For example, the CPU 23 is connected to the individual constituent elements of the information processing apparatus 100 shown in FIG. 1A, and the operations of these constituent elements are comprehensively controlled in accordance with instructions for performing processing to be explained below from the CPU 23.

The configuration examples of the image/sound playback system and information processing apparatus 100 have been explained above. However, the configuration of the information processing apparatus is not limited to the configuration explained above. For example, the sports sound acquisition unit 2, sports sound storage unit 3, cheer sound acquisition unit 5, cheer sound storage unit 6, imaging unit 11, and image storage unit 12 may also exist inside an apparatus different from the information processing apparatus 100.

Figure 3:
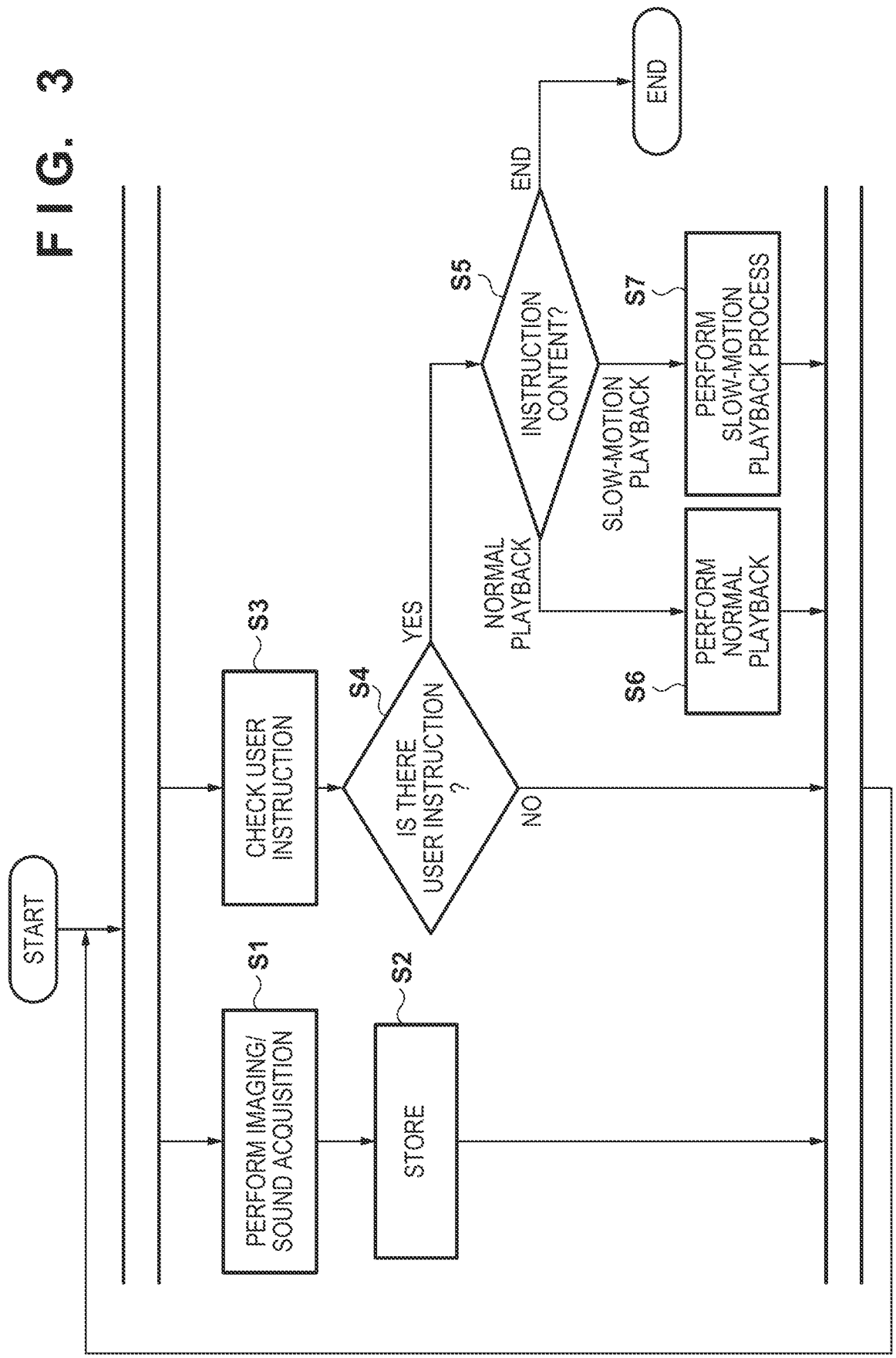
FIG. 3 is a flowchart of main processing of the information processing apparatus.

The operation of this embodiment will be explained below. FIG. 3 is a flowchart of main processing of the information processing apparatus 100 according to this embodiment. In this embodiment, processes in steps S1 and S2 and processes from step S3 to step S6 or S7 are performed in parallel. That is, FIG. 3 shows a flowchart when playing back an image and sound while performing imaging and sound acquisition. However, the present invention is not limited to this. For example, the information processing apparatus 100 may also play back an image and sound by using stored image data and sound data after completing imaging and sound acquisition.

First, the processes in steps S1 and S2 will be explained. In step S1, an imaging/sound acquisition process is performed. More specifically, as an image obtaining process, the imaging unit 11 forms image data by performing a developing process and correcting process on a video signal transmitted from the camera 10. In addition, the sports sound acquisition unit 2 and cheer sound acquisition unit 5 respectively properly amplify analog signals transmitted from the sports sound microphone 1 and cheer sound microphone 4, and convert the analog signals into digital signals (audio signals). When the process is complete, the operation advances to step S2. In step S2, the image data and audio signal obtained by imaging and sound acquisition in step S1 are recorded in the image storage unit 12, sports sound storage unit 3, and cheer sound storage unit 6, together with imaging/sound acquisition time information. When the process is complete, the operation returns to step S1 again.

Thus, the image data and sound data obtained by imaging and sound acquisition are sequentially stored in the storage units (the image storage unit 12, sports sound storage unit 3, and cheer sound storage unit 6). Since the image data and sound data are stored in these storage units together with the time information, data at an arbitrary time can be extracted by designating the time information.

Next, the processes from step S3 to step S6 or S7 will be explained. In step S3, whether the operation unit 15 has accepted an instruction from the user is checked. In step S4, the operation advances to step S5 if the operation unit 15 has accepted an instruction from the user, and returns to step S3 if not. In step S5, the operation unit 15 checks the instruction content. If the instruction content is "normal playback", the operation advances to a normal playback process in step S6. As described previously, the normal playback instruction contains the playback time interval, and the information processing apparatus 100 plays back an image of the designated time interval in synchronism with the audio signal. A playback process like this is normally performed in a general image playback apparatus and well known, so an explanation thereof will be omitted. When the process is complete, the operation returns to step S3. If the instruction content is "slow-motion playback", the operation advances to step S7. As described above, the slow-motion playback instruction contains the playback time interval and slow-motion playback speed. The information processing apparatus 100 performs a slow-motion playback process in accordance with the playback time interval and slow-motion playback speed. Details of this process will be described later with reference to FIG. 4. When the process is complete, the operation returns to step S3. If the instruction content is "end", all the processes are terminated, and the main processing is complete.

Figure 4:
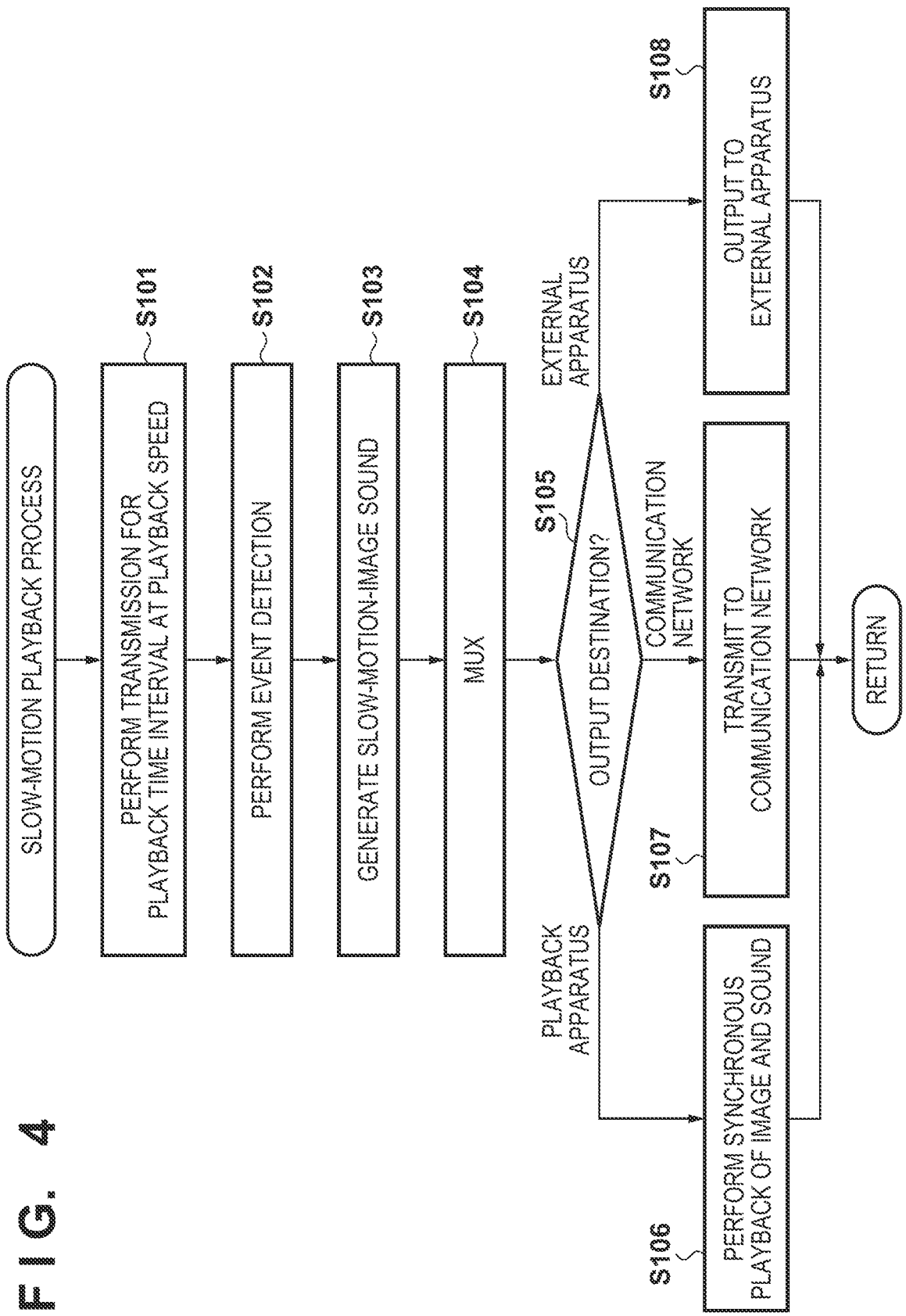
FIG. 4 is a flowchart of a slow-motion playback process.

The process in step S7 of FIG. 3 will now be explained with reference to FIG. 4. FIG. 4 is a flowchart showing the details of the slow-motion playback process in step S7 of FIG. 3.

First, in step S101, the image playback unit 13 transmits the information of the playback time interval and slow-motion playback speed contained in the slow-motion playback instruction to the event detection unit 7 and sound generation unit 8. In step S102, the event detection unit 7 detects an event by analyzing the image data and sound data in the playback time interval received in step S101. This process will be described in detail later with reference to FIG. 5.

Then, in step S103, the sound generation unit 8 generates a playback sound signal (slow-motion-image audio signal) to be played back together with a slow-motion image (slow-motion playback video signal) corresponding to the playback time interval and slow-motion playback speed received in step S101. In this embodiment, the sound generation unit 8 generates the slow-motion-image audio signal by extracting and combining the sports sound and cheer sound by different methods. This process will be described in detail later with reference to FIG. 8. In step S104, the MUX 16 superposes the slow-motion-image audio signal generated by the sound generation unit 8 and the slow-motion playback video signal generated by the image playback unit 13, thereby generating a video/audio stream. In step S105, the sound playback unit 9, image playback unit 13, and MUX 16 check the output destination. Note that output destination information is prestored in the storage unit 22. The user may also designate the output destination via the operation unit 15. If the checking result indicates that the output destination includes the image display unit 14 and a playback apparatus such as the headphone 17 or surround speakers 18, the operation advances to step S106. If the output destination is the communication network 20, the operation advances to step S107. If the output destination is an external apparatus, the operation advances to step S108.

In step S106, the image playback unit 13 plays back a slow-motion image at the designated playback speed with respect to the image of the designated time interval, outputs the image to the image display unit 14, and displays the image on the image display unit 14. In addition, the image playback unit 13 outputs a playback start trigger signal to the sound playback unit 9. Simultaneously, the sound playback unit 9 outputs the slow-motion-playback audio signal generated by the sound generation unit 8 to the headphone 17 or surround speakers 18 in response to the playback start trigger signal. Consequently, the generated slow-motion-playback audio signal and slow-motion image are synchronously played back. When the process is complete, the slow-motion playback process is terminated, and the operation returns.

In step S107, the communication unit 19 transmits the video/audio stream data generated by the MUX 16 in step S104 to the communication network 20. When the process is complete, the slow-motion playback process is terminated, and the operation returns. In step S108, the output unit 21 outputs the video/audio stream data generated by the MUX 16 in step S104 to an external apparatus connected to the output terminal. When the process is complete, the slow-motion playback process is terminated, and the operation returns.

Note that the video/audio stream data generated by the MUX 16 in step S104 is used in the processes in steps S107 and S108, but is not used in step S106, so the process in step S104 may also be performed after the determination in step S106.

Figure 5:
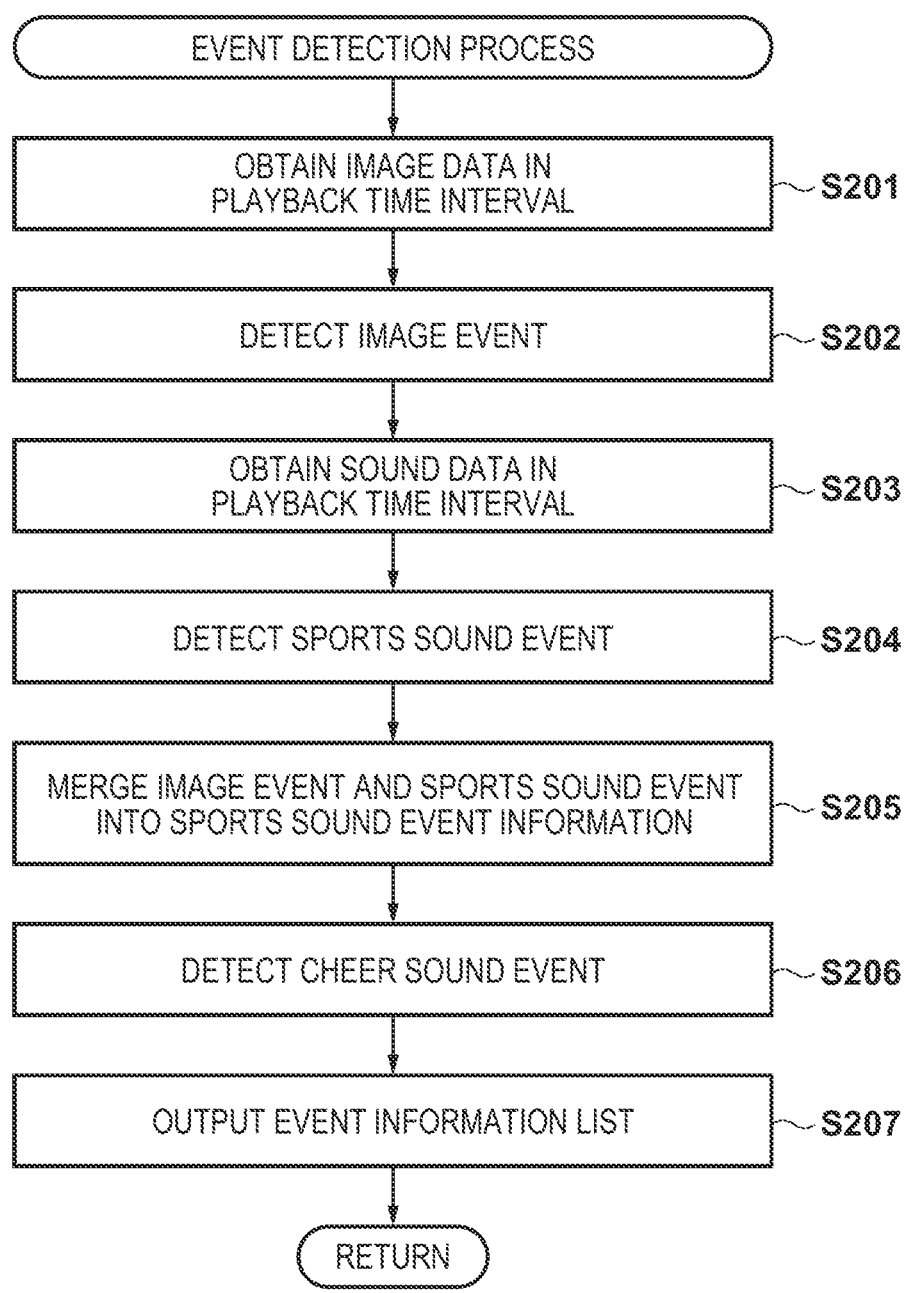
FIG. 5 is a flowchart of an event detection process.

The process in step S102 of FIG. 4 will be explained below with reference to FIG. 5. FIG. 5 is a flowchart showing details of the event detection process in step S102 of FIG. 4. In step S201, the event detection unit 7 obtains image data from the image storage unit 12 in accordance with the playback time interval received from the image playback unit 13. In step S202, the event detection unit 7 analyzes the image data obtained in step S201, thereby detecting an event having occurred in the sport as a capturing target in this time interval. For example, the event detection unit 7 performs person recognition and action analysis in the image, detects a specific action unique to the sport as a capturing target (for example, a kick in soccer) as an event, and extracts the time of this specific action (for example, the time at which the direction or speed of the ball largely changes in soccer) as an event occurrence time. This sort of event detection using an image is widely performed in image recognition and well known, so a detailed explanation thereof will be omitted. The storage unit 22 records the detected event as image event information together with the event occurrence time.

FIG. 10A shows the data structure of the image event information. As shown in FIG. 10A, the image event information contains an image event ID 111, an image event occurrence time 112, and an image event type 113. The image event ID 111 is a number for identifying event information detected by image analysis. The image event occurrence time 112 is the occurrence time of the event corresponding to the image event ID 111. The image event type 113 is the type of event (for example, "kick", "heading, or "catch" in soccer).

Then, in step S203, the event detection unit 7 obtains the sound data (sports sound signal/cheer sound signal) from the sports sound storage unit 3 and cheer sound storage unit 6, in accordance with the playback time interval received from the image playback unit 13. In step S204, the event detection unit 7 detects the event (related to the sports sound) having occurred in the sport as a capturing target by analyzing the sports sound signal obtained in step S203, and records the event as sports sound event information together with the event occurrence time and event end time in the storage unit 22. This process will be described in detail later with reference to FIG. 6.

FIG. 10B shows the data structure of the sports sound event information. As shown in FIG. 10B, the sports sound event information contains a sports sound event ID 114, an input channel number 115, a sports sound event start time 116, and a sports sound event end time 117. The sports sound event ID 114 is a number for identifying the sports sound event information. The input channel number 115 is the number of a channel on which the sound of the sports sound event corresponding to the sports sound event ID 114 (the identification number of the sports sound microphone 1) is recorded. The sports sound event start time 116 and sports sound event end time 117 are respectively the start time and end time of recording of the sports sound event corresponding to the sports sound event ID 114.

Then, in step S205, the event detection unit 7 merges the image event information (FIG. 10A) detected in step S202 to the sports sound event information (FIG. 10B) detected in step S204. For example, the event detection unit 7 refers to the image event time information (the image event occurrence time 112) and the sports sound event time information (the sports sound event start time 116 and sports sound event end time 117), and collects events having occurred at the same time as one event. The event detection unit 7 may also leave event information existing in only one of the image event information and sports sound event information. This merging process can eliminate the redundancy of event information pertaining to a single event detected from both the image and sports sound, thereby reducing the load on the later sound generation process. Also, even an event which cannot be detected as a sports sound event can be detected by an image. This makes it possible to leave information pertaining to an event which cannot be detected from sound data but may be detected by hearing.

In step S206, the event detection unit 7 analyses the cheer sound signal obtained in step S203, detects a cheer sound event related to the cheer sound, and records the event as cheer sound event information in the storage unit 22. Details of this process will be described later with reference to FIG. 7.

FIG. 10C shows the data structure of the cheer sound event information. As shown in FIG. 10C, the cheer sound event information contains a cheer sound event ID 118, an input channel number 119, a cheer sound event occurrence time 120, and a maximum sound pressure 121. The cheer sound event ID 118 is a number for identifying the cheer sound event. The input channel number 119 is a channel number on which the sound of the cheer sound event corresponding to the cheer sound event ID 118 is recorded (the identification number of the cheer sound microphone 4). The cheer sound event occurrence time 120 is the time of recording when the cheer sound event corresponding to the cheer sound event ID 118 has occurred. The maximum sound pressure 121 is a maximum sound pressure level from the occurrence time of the cheer sound data corresponding to the cheer sound event ID 118 to the end of the peak of the sound pressure.

In step S207, a list (event information list) of the cheer sound event information merged in step S205 and the cheer sound event information detected in step S206 are output to the sound generation unit 8. When the process is complete, the event detection process is terminated, and the operation returns.

Figure 6:
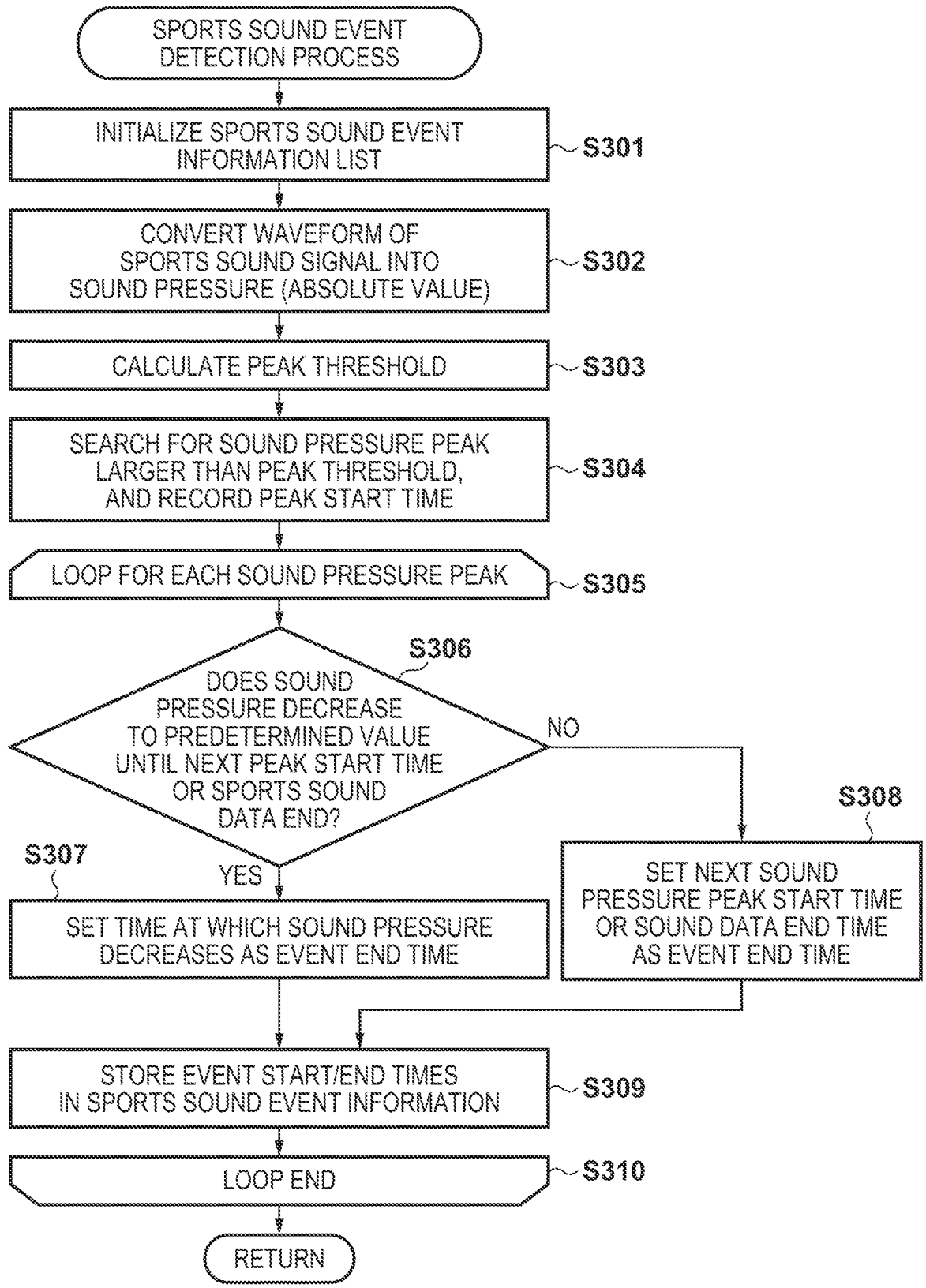
FIG. 6 is a flowchart of a sports sound event detection process.

The process in step S204 of FIG. 5 will be explained below with reference to FIG. 6. FIG. 6 is a flowchart showing details of the sports sound event detection process in step S204 of FIG. 5. In step S301, the event detection unit 7 initializes the sports sound event information list stored in the storage unit 22. The sports sound event information list sequentially stores sports sound event information to be detected hereafter in the process of this flowchart. In step S302, the event detection unit 7 converts the waveform of the sports sound signal obtained in step S203 into time sound pressure data by calculating the absolute value of the time amplitude of the sports sound signal. In step S303, the event detection unit 7 calculates the time average value of the time sound pressure data obtained in step S302, and calculates a peak threshold by multiplying the time average value by a predetermined multiple A. The predetermined multiple A is a number predetermined based on a target sport, the layout of the sports sound microphones 1 and cheer sound microphones 4, and the like.

In step S304, the event detection unit 7 searches for all sound pressure peaks larger than the peak threshold calculated in step S303 from the time sound pressure data obtained in step S302. Then, the event detection unit 7 detects the peak start time of each peak found by the search (the time at which the sound pressure starts rising toward the peak), and records the peak start time in the storage unit 22.

Processing from step S305 to step S310 is loop processing for each sound pressure peak recorded in step S304. First, in step S306, the event detection unit 7 determines whether the sound pressure decreases to a predetermined value until the next peak start time or the sports sound data end time. This predetermined value can be determined as an arbitrary value. If the sound pressure decreases to the predetermined value (YES in step S306), the operation advances to step S307. If not (NO in step S306), the operation advances to step S308.

In step S307, the event detection unit 7 determines the time at which the sound pressure decreases to the predetermined value, as the sports sound event end time 117. On the other hand, in step S308, the event detection unit 7 determines the time immediately before the next sound pressure peak start time, or the sound data end time if there is no next peak, as the sports sound event end time 117. In step S309, the event detection unit 7 forms new sports sound event information, sets the peak start time as the sports sound event start time 116, stores the sports sound event start time 116 and the sports sound event end time 117 determined in step S307 or S308 in the sports sound event information, and adds the sports sound event information to the sports sound event information list. At the same time, the event detection unit 7 adds the input channel number 115 to the sports sound event information. Also, when adding new sports sound event information to the sports sound event information list, the event detection unit 7 issues the sports sound event ID 114, and stores the sports sound event ID 114 in the sports sound event information to be added. Note that the event detection unit 7 may also store information of the maximum sound peak between the sports sound event start time 116 and sports sound event end time 117 as a maximum pressure value in the sports sound event information.

When all the sound pressure peaks are completely processed, the loop processing is complete in step S310, the sports sound event detection process is terminated, and the operation returns. By the processing as described above, a sound generated by a specific object, for example, a sound generated when a player kicks the ball is detected as a sports sound event.

Figure 7:
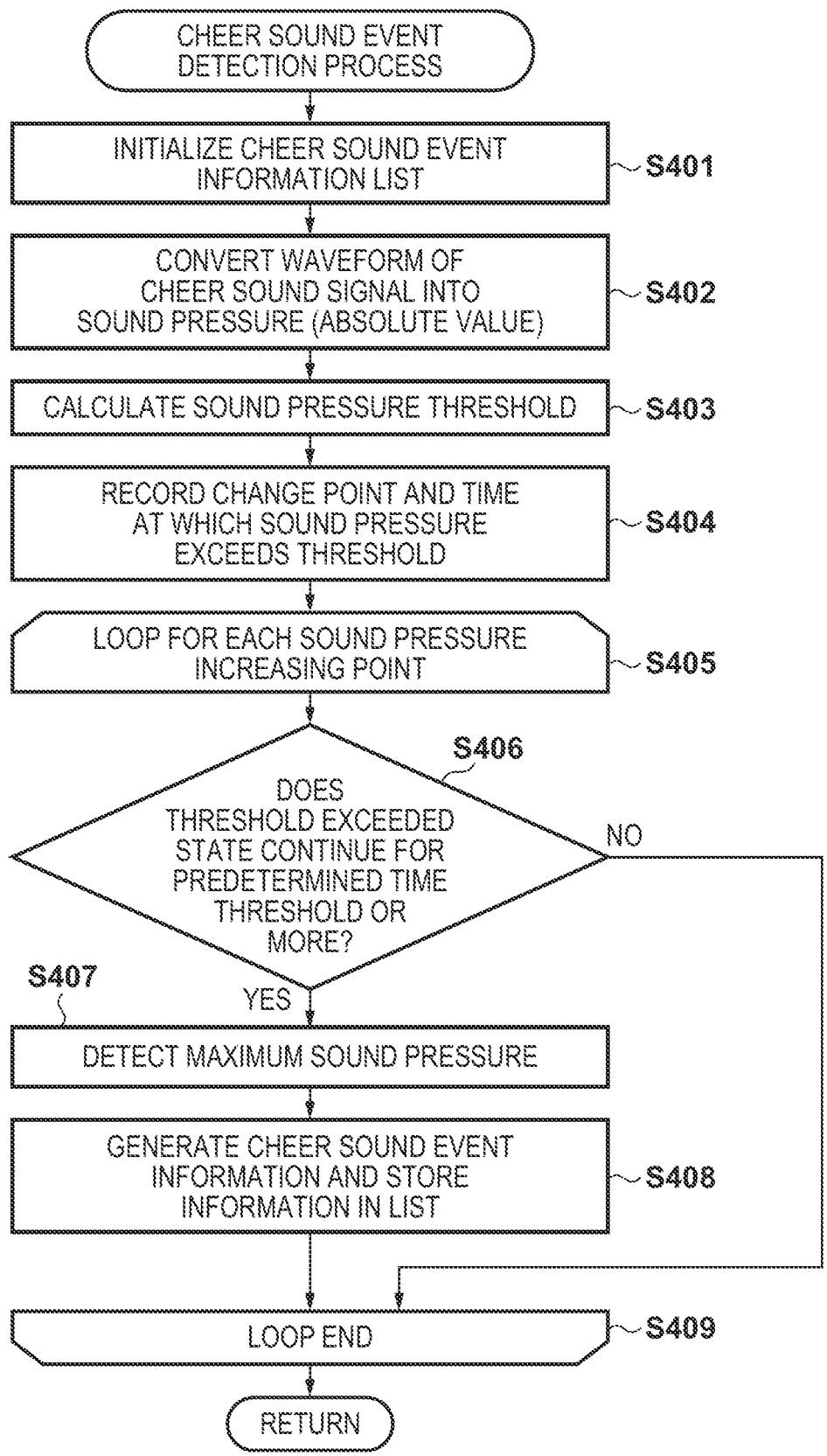
FIG. 7 is a flowchart of a cheer sound event detection process.

The process in step S206 of FIG. 5 will be explained below with reference to FIG. 7. FIG. 7 is a flowchart showing details of the cheer sound event detection process in step S206 of FIG. 5. First, in step S401, the event detection unit 7 initializes the cheer sound event information list stored in the storage unit 22. In step S402, the event detection unit 7 converts the waveform of the cheer sound signal obtained in step S203 into time sound pressure data by calculating the absolute value of the time amplitude of the cheer sound signal. In step S403, the event detection unit 7 calculates a value determined from the time average value of the time sound pressure data obtained in step S402, as a sound pressure threshold. In step S404, the event detection unit 7 searches the whole cheer sound data for a change point (sound pressure increasing point) at which the sound pressure becomes larger than the sound pressure threshold obtained in step S403, and records all times (sound pressure increasing times) found by the search in the storage unit 22.

Processing from step S405 to step S409 is loop processing for each sound pressure increasing time detected in step S404. First, in step S406, the event detection unit 7 determines whether a state in which the sound pressure is higher than the sound pressure threshold continues for a predetermined time interval from the sound pressure increasing time. Note that this time interval can be determined based on a target sport, the size of a place where the sport is performed, and the like. If it is determined that the state in which the sound pressure is higher than the threshold continues for the predetermined time interval or more (YES in step S406), the operation advances to step S407. If not (NO in step S406), the operation advances to step S409.

In step S407, the event detection unit 7 detects a maximum sound pressure in the time interval from the sound pressure increasing time to the end of the state in which the sound pressure is higher than the threshold. In step S408, the event detection unit 7 forms new cheer sound event information by setting the sound pressure increasing time of the processing target as the cheer sound event occurrence time, stores the input channel number 119, the cheer sound event occurrence time 120, and the maximum sound pressure 121 detected in step S407 in the cheer sound event information, adds the cheer sound event information to the cheer sound event information list, and stores the list in the storage unit 22. When adding the new cheer sound event information to the cheer sound event list, the event detection unit 7 issues the cheer sound event ID 118, and stores the cheer sound event ID 118 in the cheer sound event information to be added.

In step S409, if all the sound pressure increasing times are completely processed, the loop processing is terminated, the cheer sound event detection process is complete, and the operation returns.

As described above, the event detection unit 7 detects a cheer sound event based not only on the sound pressure increasing time, but also on whether the sound pressure increasing state continues after that. This makes it possible to prevent detection of suddenly generated noise, and detect a part in which the cheers become louder because, for example, a player kicks the ball, as an event.

Figure 8:
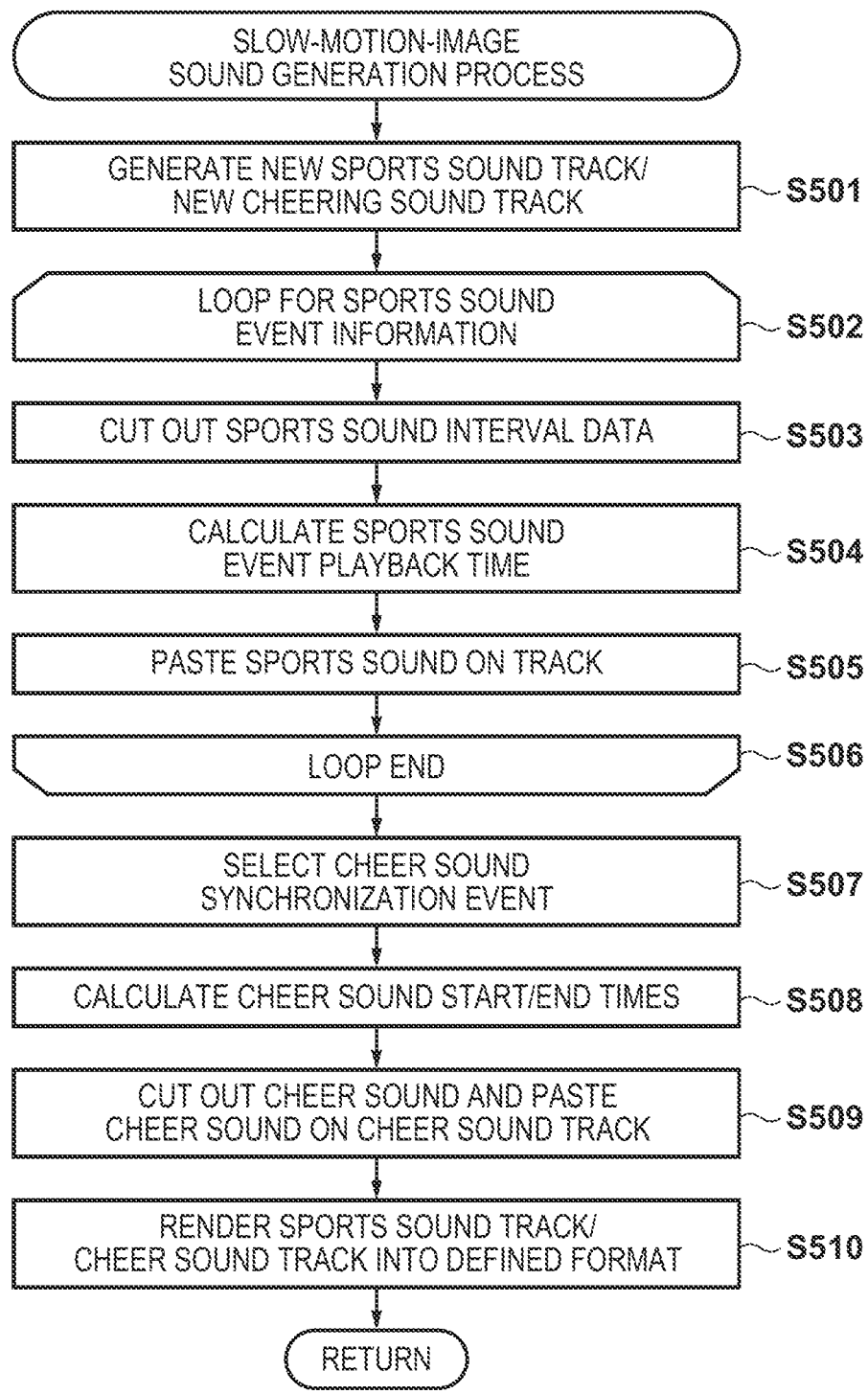
FIG. 8 is a flowchart of a slow-motion-image sound generation process.

The process in step S103 of FIG. 4 will be explained below with reference to FIG. 8. FIG. 8 is a flowchart showing details of the slow-motion-image sound generation process in step S103 of FIG. 4. First, in step S501, the sound generation unit 8 forms a new sports sound track and new cheer sound track in the storage unit 22. The sports sound track and cheer sound track are buffers for storing the time waveform data of the sports sound signal and cheer sound signal, respectively. The time length of each track is matched with the playback time length of the slow-motion image. This can be calculated based on the playback time interval and playback speed of the slow-motion playback image received from the image playback unit in step S101. For example, assuming that the playback time interval of the slow-motion playback image is [t1, t2] and slow-motion playback is performed at a playback speed of 1/A, a time length T of each track can be obtained by:

$$T = A \times (t2-t1) \tag{1}$$

Processing from step S502 to step S506 is loop processing for each sports sound event information contained in the sports sound event information list transmitted from the event detection unit 7. In step S503, the sound generation unit 8 obtains a sports sound from the sports sound event start time 116 (the start timing) to the sports sound event end time 117 (the end timing) by cutout (extraction) from the sports sound storage unit 3. In step S504, the sound generation unit 8 calculates the timing at which an image obtained at the same time as the sports sound event occurrence time is played back during slow-motion playback, based on the playback time interval and slow-motion playback speed received from the image playback unit in step S101 of FIG. 4. Assume that slow-motion playback is performed based on the playback time interval and slow-motion playback speed. Letting te be the occurrence time of the sports sound event as a target, a playback timing Tr of the sports sound event when the playback start time of the slow-motion image is 0 can be calculated by:

$$Tr = A \times (te-t1) \tag{2}$$

Then, in step S505, the sound generation unit 8 pastes the sports sound cut out in step S503 onto the sports sound track so that playback starts from the playback timing obtained in step S504. This makes it possible to playback the sports sound in synchronism with the timing at which the image at the occurrence time of the sports sound event is played back.

In step S506, if all pieces of the sports sound event information are completely processed, the loop is terminated, and the operation advances to step S507. In step S507, the sound generation unit 8 selects an event (reference event) as a reference for synchronizing (associating) the cheer sound with the slow-motion playback image, from the events contained in the sports sound event information and cheer sound event information. Details of this process will be described later with reference to FIG. 9.

In step S508, the sound generation unit 8 calculates the start and end times of the cheer sound to be played back together with the image, based on the start time of the event selected in step S507. Assume that slow-motion playback is performed in the playback time interval at the slow-motion playback speed of the slow-motion playback image described above. Assuming that the start time of the selected event is a starting point ts, a start time tt and end time tb of the cheer sound are calculated by:

$$tt = ts - A \times (ts - t1)$$

$$tb = ts + A \times (t2 - ts) \tag{3}$$

In step S509, the sound generation unit 8 cuts out the cheer sound signal of the time interval calculated in step S507, that is, [tt, tb], from the cheer sound storage unit 6. That is, the time interval of the cutout cheer sound signal is longer than the time interval of the slow-motion playback image. Note that if a cheer sound event is selected as the reference event in step S507, cutout is performed from the input channel signal of the selected cheer sound event information. If a sports sound event is selected as the reference event in step S507, cutout is performed from a signal of a preselected cheer sound channel. The sound generation unit 8 pastes the cutout signal on the cheer sound track from the head of the track in step S509. Since the time length of the [tt, tb] interval is exactly the same as the time length of the track, the signal can be pasted without any time gap. Accordingly, the cheer sound is played back without any interruption during the slow-motion image playback time.

In step S510, the sound generation unit 8 renders the sports sound track and cheer sound track generated by the above processes into a defined sound format such as "stereo", "binaural", or "surround". It is also possible to pre-define position information for each sports sound and each cheer sound, and perform rendering such that a sound image is formed at the position. The sound generation unit 8 may also perform rendering by using the position information of a microphone having acquired a sound of the input channel of each signal and the position information of a camera having captured an image, so as to generate a sound image in a direction viewed from the image capturing position. Processing like this is generally performed in the field of sound playback and well known, so a detailed explanation thereof will be omitted. When the processing is complete, the slow-motion-image sound generation process is terminated, and the operation returns.

Figure 9:
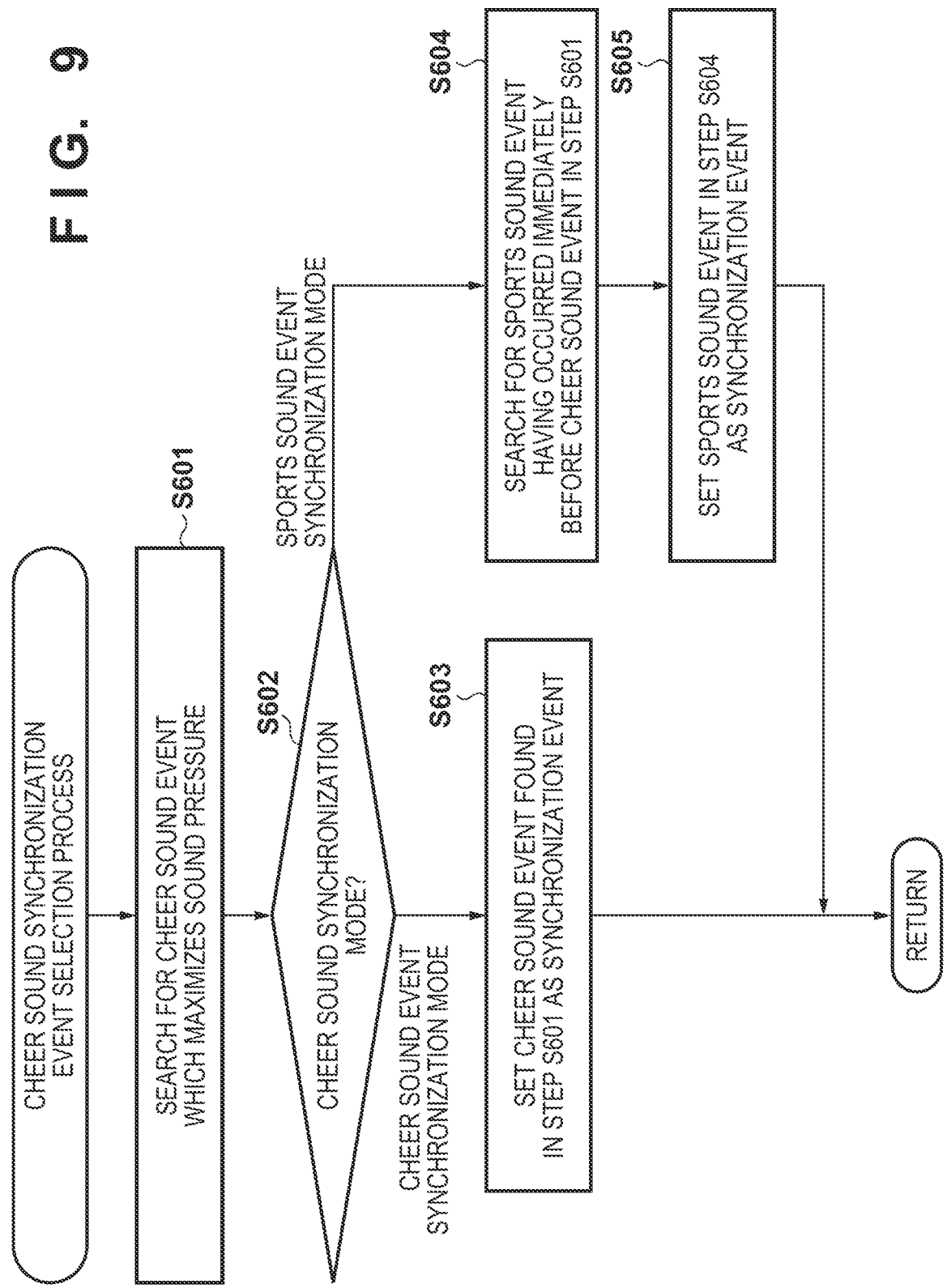
FIG. 9 is a flowchart of a reference event selection process.

The process in step S508 of FIG. 8 will be explained below with reference to FIG. 9. FIG. 9 is a flowchart showing details of the reference event selection process in step S508 of FIG. 8. In this flowchart, it is assumed that the operation unit 15 has accepted an instruction to select a cheer sound event synchronization mode or sports sound event synchronization mode from the user, and has stored a mode corresponding to the instruction in the storage unit 22.

First, in step S601, the sound generation unit 8 searches for cheer sound event information having the highest maximum sound pressure 121, from the cheer sound event information stored in the cheer sound event information list. Then, in step S602, the sound generation unit 8 checks the cheer sound synchronization mode stored in the storage unit 22. If the cheer sound synchronization mode is the cheer sound event synchronization mode, the operation advances to step S603. If the cheer sound synchronization mode is the sports sound event synchronization mode, the operation advances to step S604.

In step S603, the sound generation unit 8 selects the cheer sound event having the maximum sound pressure 121 found in step S601 as the reference event. That is, in this case, the cheer sound event occurrence time 120 contained in the cheer sound event information having the maximum sound pressure 121 is ts in equation (3) above. When this processing is complete, the reference event selection process is terminated, and the operation returns.

On the other hand, in step S604, the sound generation unit 8 searches the sports sound event information for a sports sound event having occurred immediately before the occurrence time of the cheer sound event having the maximum sound pressure 121 found in step S601. In step S605, the sound generation unit 8 selects this sports sound event as the reference event. That is, in this case, the sports sound event start time 116 (or the sports sound event end time 117) immediately before the cheer sound event occurrence time 120 contained in the cheer sound event having the maximum sound pressure 121 is ts in equation (3). By thus selecting a sports sound event as the reference event, the time from the occurrence of a sports event as the cause of a cheer to the arising of the cheer can be maintained even in slow-motion image playback, in the same manner as in normal playback. Accordingly, sound playback having a more presence can be performed in slow-motion playback in some cases. When this processing is complete, the reference event selection process is terminated, and the operation returns.

Figure 11A:
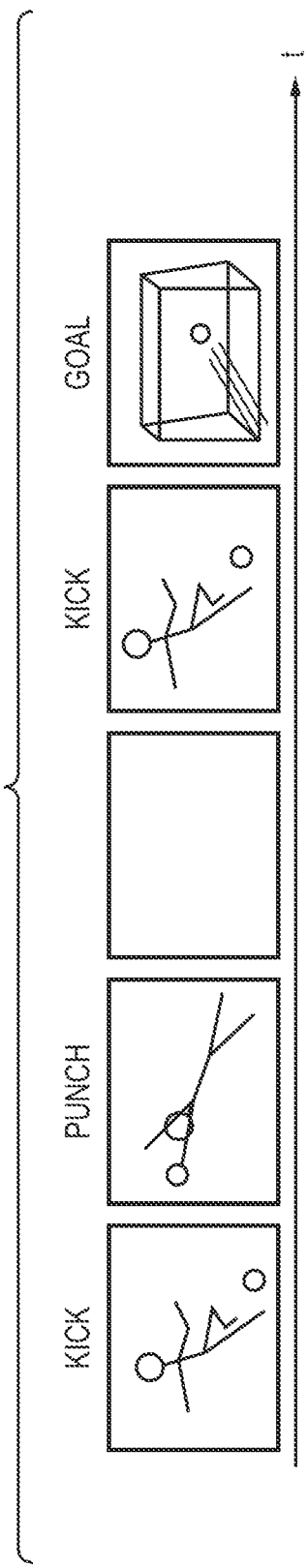
FIGS. 11A to 11C are images of timing charts showing the results of sound generation and playback according to an embodiment.
Figure 11B:
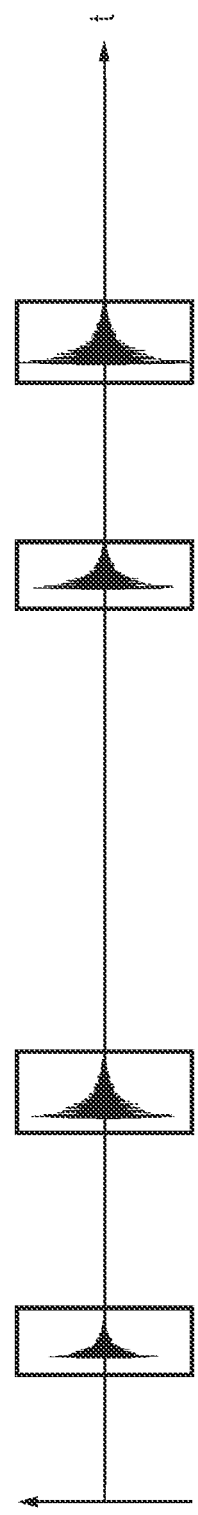
Figure 11C:
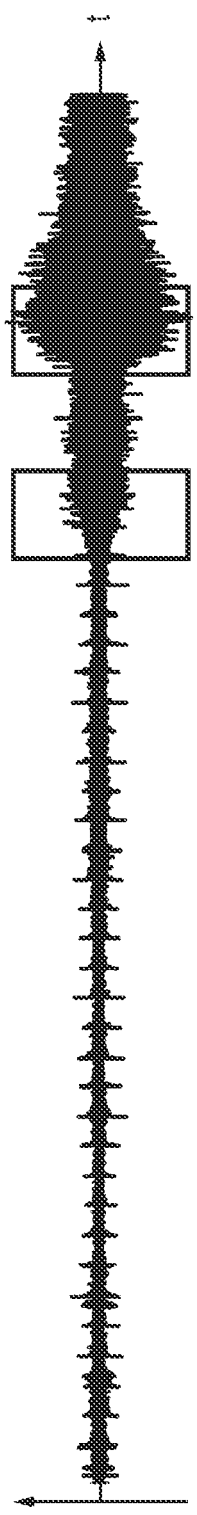

FIGS. 11A to 11C are images of timing charts showing the results of sound generation and playback performed by this embodiment. FIG. 11A shows some frames of an image displayed in slow-motion image playback along the time. FIG. 11B shows a sports sound signal waveform. FIG. 11C shows a cheer sound signal waveform. "Kick", "punch", "kick", and "goal" are detected as sports sound events in FIGS. 11A to 11C, and FIG. 11A shows frames at the occurrence times of these events. Also, as shown in FIG. 11B, a sports sound signal of each event based of sound acquisition in a period shorter than an imaging period corresponding to the slow-motion image is cut out and pasted in accordance with the slow-motion image playback timing. Even in slow-motion image playback, therefore, it is possible to synchronously playback an image and sound in accordance with an event having occurred in a sport.

On the other hand, FIG. 11C shows the waveform of a cheer sound cut out in accordance with the length of the slow-motion image. The cheer sound is played back at a speed higher than that of the slow-motion image, and the playback period of the slow-motion image is the same as that of the cheer sound. Accordingly, the cheer sound is an audio signal based on sound acquisition in a period longer than an imaging period corresponding to the slow-motion image. Portions surrounded by rectangles are detected as cheer sound events, and the second event having a higher sound pressure is selected as a synchronous event. Thus, a portion in which the cheer is loudest is played back in synchronism with the playback time of the slow-motion image. In addition, a cheer having no sound deterioration can be played back without any interruption over the whole slow-motion image.

Note that in this embodiment, the case in which there are one sports sound signal and one cheer sound signal has been explained. However, if a plurality of acquired sound signals are generated by a plurality of microphones as shown in FIG. 2, it is also possible to repeat sports sound processing for sports sounds and cheer sound processing for cheer sounds the same number of times as the number of acquired sound signals, and mix the processed sounds. Alternatively, one outstanding sports sound and one outstanding cheer sound may also be selectively used. Furthermore, it is also possible to specify a place where an event as the focal point of the sport is occurring in the slow-motion playback target time interval, and use a sports sound and cheer sound acquired by microphones closest to that place.

Note also that in this embodiment, the sports sound microphones 1 and cheer sound microphones 4 are so installed as to separately acquire sounds in different regions, that is, the sports sound microphones 1 acquire sports sounds, and the cheer sound microphones 4 acquire cheer sounds. However, the present invention is not limited to this, and a plurality of microphones may also be installed without distinguishing between the sports sound microphones 1 and cheer sound microphones 4. In this case, sports sounds and cheer sounds can be extracted by a known sound source separation process from sound signals acquired by the plurality of microphones.

In this embodiment described above, the information processing apparatus 100 generates a sound corresponding to a time interval (sound acquisition period) longer than a time interval (imaging period) corresponding to an image to be played back, as a sound to be played back together with the image. Even when playing back an image in slow motion, therefore, an equal-speed (onefold-speed) sound whose playback speed is not changed is played back together with the image. This makes it possible to suppress the generation of a soundless period during the playback of the slow-motion image while reducing the deterioration of the sound quality and the unnaturalness of the sound. As a consequence, a sound based on the actual sound and suitable for a slow-motion image can be generated and played back over the whole image. Note that even when the playback speed of a sound to be played back is changed, the unnaturalness of the sound is hardly perceived by a listener if the degree of change is small. Therefore, when the playback speed of a slow-motion image is higher than a threshold and close to an equal speed, a playback audio signal may also be generated by prolonging a cheer sound (decreasing the playback speed of the sound) corresponding to a sound acquisition period having the same length as that of an imaging period corresponding to the slow-motion image. Also, in the case shown in FIG. 11C, the climax of the cheer sound exists in only a single event ("goal"), so there is no incongruity even when playing back the equal-speed cheer sound and slow-motion image together. On the other hand, if the climax of the cheer sound exists in a plurality of events (for example, "punch" and "goal"), the cheer sound in a non-climax portion can be prolonged or repetitively played back in order to prevent a shift between the timing of the climax of the cheer sound and the timing of the event of the slow-motion image.

Furthermore, in order that an image to be played back in slow motion and a sound to be played back at an equal speed are synchronized at the timing of a predetermined event, the information processing apparatus 100 sets the time interval of the sound corresponding to the slow-motion image. This can improve the presence when playing back the image and sound of an event on which a viewer focuses.

In addition, the information processing apparatus 100 classifies sounds to be acquired into a sports sound generated from a specific sound source and a cheer sound different from the sports sound. Then, the information processing apparatus 100 generates a sound to be played back by using a cheer sound having a time interval longer than a time interval corresponding to an image, and a sports sound having a time interval included in the time interval corresponding to the image.

More specifically, in order that the timing of the maximum climax portion of the cheer sound is synchronized with a corresponding scene of the slow-motion image, a cheer sound having a time interval longer in both front and rear portions than a time interval corresponding to the image is cut out in accordance with the slow-motion playback time. On the other hand, an event portion is extracted from the sports sound, and a sound is generated so that the extracted sports sound is played back in synchronism with the corresponding event portion in the image. Consequently, it is possible to suppress a shift between the timings of the sports sound and image in the event portion, and reduce incongruity to be given to a viewer. In particular, even when a plurality of events occur in an image playback interval, it is possible to suppress a shift between a sports sound and image in each of the plurality of event portions.

OTHER EMBODIMENTS

In the above-described embodiment, the event detection process is performed in accordance with the slow-motion playback instruction. However, event detection may also be performed when storing acquired sound signals in the storage unit. Also, in the above-described embodiment, when merging the image event information and sports sound event information, an event detected on only one side is left behind. However, a sports sound event for which no image event is detected may also be deleted by regarding it as a detection error.

In the above-described embodiment, the event detection process is performed for each of an image, sports sound, and cheer sound. However, the event detection process may also be performed for one or two of an image, sports sound, and cheer sound. For example, it is also possible to perform event detection for only an image, and specify those portions of a sports sound and cheer sound, which have time information corresponding to an event detected from the image. Alternatively, the user inputs an instruction to designate an event portion via the operation unit 15 without performing any event detection process, and the information processing apparatus 100 specifies event portions of an image, sports sound, and cheer sound based on the instruction.

In the above-described embodiment, an event portion is cut out from a sports sound and synthesized with a cheer sound. However, the present invention is not limited to this, and it is also possible to synthesize a sports sound to be played back in slow motion like an image with an equal-speed cheer sound. In addition, the playback speed of the cheer sound is not limited to an equal speed and need only be a playback speed higher than that of an image.

In the above-described embodiment, an image is played back in slow motion. However, the present invention is not limited to this, and the playback period of an image need only be longer than that when playing back the image at an equal speed. For example, even when playing back an image containing both a portion to be played back at an equal speed and a portion to be played back in slow motion, a sound suitable for the image can be generated by applying the above embodiment.

Furthermore, when fast-forwarding an image on the contrary to the operation explained in the above-described embodiment, a sound having a time interval shorter than a time interval (imaging period) corresponding to the image may also be generated as a sound to be played back together with the image. A sound suitable for an image can be generated by this method as well. The present invention can also be carried out by other embodiments without departing from the spirits and scope of the above embodiment.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-094879, filed May 11, 2017, which is hereby incorporated by reference herein in its entirety.

What is claimed is:
1. A signal processing apparatus comprising:
one or more hardware processors; and
one or more memories which store instructions executable by the one or more hardware processors to cause the signal processing apparatus to perform:
obtaining information regarding a playback period of a video image that is based on captured image data of a capturing target region, wherein the playback period of the video image is longer than an image capturing period corresponding to the video image;
obtaining a first audio signal that contains a sound in the capturing target region picked up by a microphone in a first sound-pickup period shorter than the image capturing period;

obtaining a second audio signal that contains a sound in a peripheral region of the capturing target region picked up by a microphone in a second sound-pickup period longer than the image capturing period based on the obtained information; and synthesizing the obtained first audio signal and the obtained second audio signal such that a timing of the first audio signal is consistent with a timing of an event that occurred at the capturing target region in the image capturing period, thereby generating a playback audio signal to be played back together with the video image.

2. The apparatus according to claim 1, wherein the instructions further cause the apparatus to perform detecting an event occurred at the capturing target region in the image capturing period, and wherein the first audio signal is obtained by extracting, based on the result of the detecting the event, the first audio signal from a sound signal acquired based on sound acquisition by a microphone in the image capturing period.

3. The apparatus according to claim 2, wherein the event is detected based on loudness of a sound contained in the sound signal.

4. The apparatus according to claim 2, wherein the event occurred in the capturing target region is detected based on an image captured in the image capturing period.

5. The apparatus according to claim 2, wherein the first sound-pickup period includes a time of the detected event, and the playback audio signal is generated such that a timing at which an image corresponding to the event in the video image is played back is consistent with a timing at which a sound corresponding to the event in the playback audio signal is played back.

6. The apparatus according to claim 2, wherein the instructions further cause the apparatus to perform playback, based on the detecting the event, the generated playback audio signal in synchronism with the video image.

7. The apparatus according to claim 1, wherein the instructions further cause the apparatus to perform detecting an event occurred at the capturing target region in the image capturing period, and wherein the second audio signal is obtained by extracting, based on the result of the detecting the event, the second audio signal from a sound signal acquired based on sound acquisition by a microphone in a period including the image capturing period and longer than the second sound-pickup period.

8. The apparatus according to claim 1, wherein the instructions further cause the apparatus to perform obtaining a third audio signal that contains a sound in the capturing target region picked up by a microphone in a third sound-pickup period shorter than the image capturing period, and wherein the first sound-pickup period and the third sound-pickup period are different, and wherein the obtained first audio signal, the obtained second audio signal, and the obtained third audio signal are synthesized, thereby generating the playback audio signal to be played back together with the video image.

9. The apparatus according to claim 1, wherein a playback period of the video image and a playback period of the second audio signal are the same.

10. The apparatus according to claim 1, wherein the instructions further cause the apparatus to perform:

obtaining information for specifying the image capturing period corresponding to the video image and a playback speed of the video image; and determining a length of the second audio signal to be obtained, based on the obtained information, wherein the second audio signal is obtained in accordance with the determining.

11. The apparatus according to claim 1, wherein the first audio signal is obtained based on sound acquisition by a microphone included in a first microphone group, and the second audio signal is obtained based on sound acquisition by a microphone included in a second microphone group different from the first microphone group.

12. The apparatus according to claim 1, wherein the first audio signal is an audio signal whose playback speed is not changed.

13. The apparatus according to claim 12, wherein the second audio signal is an audio signal whose playback speed is not changed.

14. The apparatus according to claim 1, wherein the capturing target region is a game field or stage, and the peripheral region is a spectator seat.

15. The apparatus according to claim 1, wherein the video image includes a slow-motion image.

16. A signal processing method of generating a playback audio signal to be played back together with a slow-motion image based on image capturing in a capturing target region, comprising:

obtaining information regarding a playback period of a video image that is based on captured image data of a capturing target region, wherein the playback period of the video image is longer than an image capturing period corresponding to the video image;

obtaining a first audio signal that contains a sound in the capturing target region picked up by a microphone in a first sound-pickup period shorter than the image capturing period;

obtaining a second audio signal that contains a sound in a peripheral region of the capturing target region picked up by a microphone in a second sound-pickup period longer than the image capturing period based on the obtained information; and synthesizing the obtained first audio signal and the obtained second audio signal such that a timing of the first audio signal is consistent with a timing of an event that occurred at the capturing target region in the image capturing period, thereby generating a playback audio signal to be played back together with the video image.

17. The method according to claim 16, further comprising detecting an event occurred at the capturing target region in the image capturing period, wherein the first audio signal is obtained by extracting, based on the result of the detecting the event, the first audio signal from a sound signal acquired based on sound acquisition by a microphone in the image capturing period.

18. The method according to claim 17, wherein the first sound-pickup period includes a time of the detected event, and the playback audio signal is generated such that a timing at which an image corresponding to the event in the video image is played back is consistent with a timing at which a sound corresponding to the event in the playback audio signal is played back.

19. A non-transitory computer-readable storage medium storing a computer program for causing a computer to execute a signal processing method, the method comprising:

obtaining information regarding a playback period of a video image that is based on captured image data of a capturing target region, wherein the playback period of the video image is longer than an image capturing period corresponding to the video image;

obtaining a first audio signal that contains a sound in the capturing target region picked up by a microphone in a first sound-pickup period shorter than the image capturing period;

obtaining a second audio signal that contains a sound in a peripheral region of the capturing target region picked up by a microphone in a second sound-pickup period longer than the image capturing period based on the obtained information; and synthesizing the obtained first audio signal and the obtained second audio signal such that a timing of the first audio signal is consistent with a timing of an event that occurred at the capturing target region in the image capturing period, thereby generating a playback audio signal to be played back together with the video image.

* * * * *